United States Patent [19]

Naumburg

[11] Patent Number: 5,004,377

[45] Date of Patent: Apr. 2, 1991

[54] ISOLATED INSERTION CHUTE FOR SUCTION-OPERATED GARBAGE DISPOSAL SYSTEMS

[76] Inventor: Per Naumburg, Borgnyvägen 5, Djursholm, Sweden, S-182 65

[21] Appl. No.: 460,170

[22] PCT Filed: Aug. 10, 1988

[86] PCT No.: PCT/SE88/00404

§ 371 Date: Feb. 1, 1990

§ 102(e) Date: Feb. 1, 1990

[87] PCT Pub. No.: WO89/01450

PCT Pub. Date: Feb. 23, 1989

[30] Foreign Application Priority Data

Aug. 17, 1987 [SE] Sweden ............................... 8703188

[51] Int. Cl.[5] ............................................ B65G 53/46

[52] U.S. Cl. .................................... 406/120; 406/127; 193/33

[58] Field of Search ........................ 406/120, 127, 145; 193/33, 34; 222/335, 381

[56] References Cited

U.S. PATENT DOCUMENTS 1,886,793 11/1972 Davidson .
3,316,026 4/1967 Hallström ....................... 406/120 X
3,687,503 8/1972 Ekstrom et al. .................... 406/120
3,977,729 8/1976 Olson et al. ......................... 406/120
4,640,403 2/1987 McDermott .......................... 193/34

FOREIGN PATENT DOCUMENTS 655834 4/1929 France .
381021 11/1975 Sweden .
8101155-3 8/1980 Sweden .
1084661 9/1967 United Kingdom .................. 193/34

*Primary Examiner*—Joseph F. Peters, Jr.
*Assistant Examiner*—Carla Mattix
*Attorney, Agent, or Firm*—Witherspoon & Hargest

[57] ABSTRACT

The invention relates to a separate insertion chute (103) of the type which at spaced intervals are connected to an underground suction conveying conduit (106) communicating with a refuse suction system, the upper end above ground of each chute being provided with a closable insertion opening and the lower end below ground of each chute being connected to the suction conveying conduit. According to the invention, the insertion chute (103) consists of an upper chute portion (103*a*) which at its lower end is provided with a connecting flange (108*a*), and a lower chute portion (103*b*) which at its upper end is provided with a connecting flange (108*e*), said lower chute portion (103*b*) being received in a branching (109) extended from the suction conveying conduit (106), said branching likewise being provided with a connecting flange (108*g*) at its upper end. The connecting flange (108*e*) of the lower chute portion is releasably clamped between the flange (108*a*) of the upper chute portion and the connecting flange (108*g*) of the branching and the branching (109) has such a length in relation to the depth of the suction conveying conduit (106) below the ground surface, that the flange joint (108) formed by the connecting flanges (108*a*, 108*e* and 108*g*) is positioned above the ground surface.

22 Claims, 5 Drawing Sheets

ISOLATED INSERTION CHUTE FOR SUCTION-OPERATED GARBAGE DISPOSAL SYSTEMS

BACKGROUND OF THE INVENTION

The invention relates to isolated insertion chutes which at spaced intervals are connected to an underground suction conveying conduit communicating with a refuse suction system, with the upper end above ground of every chute being provided with an insertion opening that may be closed and with the lower end below ground of every chute being connected to the suction conveying conduit.

DESCRIPTION OF THE PRIOR ART

The present invention starts from the insertion chute of the above indicated kind which for instance is disclosed and illustrated in Swedish patent specification No. 7302382-2 (publication No. 381 021). This previously known insertion chute is connected—possibly through a valve means provided at the lower end of the insertion chute—to the underground collecting conduit, said connection to the collecting conduit and said valve, if present, being provided below the ground surface immediately adjacent the collecting conduit. In order to permit access to the collecting conduit in case it is clogged or obstructed close to the connecting point of the insertion chute or to permit maintenance, repair and possibly exchange of the valve means or parts thereof, the lower portion of the insertion chute is enclosed in a chamber provided below the ground surface and being accessible from the ground surface for instance through a hatch. This solution causes substantial costs both for the additional digging or dredging required at the locations where insertion chutes are to be positioned, in order to also provide sufficient space for a chamber having such dimension that personnel without difficulty may get down into the chamber to perform necessary work, and for the work performed in connection with casting the chamber in itself. Naturally the maintenance or repair work is also inconvenient and troublesome, and this is true even if the chamber is properly dimensioned, and particular problems arise especially if parts cannot be repaired on location but must be removed for repair or must be exchanged.

SUMMARY OF THE INVENTION

Thus, the principal object of the present invention is to provide an insertion chute of the above indicated kind, by means of which the above described disadvantages in connection with the prior art insertion chute may be eliminated, while the reliable operation of the insertion chute must also be maintained.

This object is attained by means of an apparatus of the kind indicated in the characterizing portion of the enclosed claim 1.

Preferred improvements and suitable embodiments of the invention are indicated in the dependent subclaims.

BRIEF DESCRIPTION OF THE DRAWINGS

With the purpose of exemplifying the invention an embodiment thereof is disclosed more closely below in connection with the enclosed drawings, in which.

DESCRIPTION OF THE PREFERRED EMBODIMENTS

Figure 1:
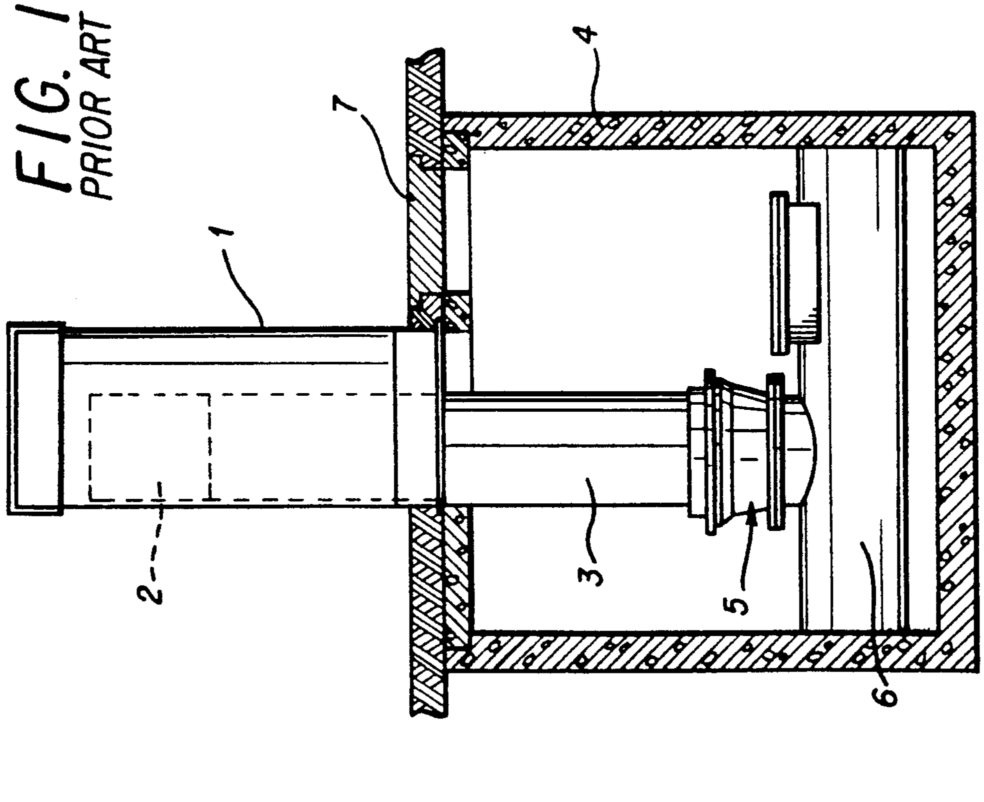
FIG. 1 PRIOR ART
FIG. 1 illustrates a prior art insertion chute.

FIG. 1 schematically illustrates an example of the previously known technique from which the present invention starts and which is disclosed in Swedish patent specification No. 7302382-2. This known system comprises a column 1 positioned above the ground surface and having a sluice-like refuse receiving means 2. The sluice like refuse receiving means 2 is provided adjacent the upper end of an insertion chute 3 which extends down through the column 1 and into a chamber 4 provided below the ground surface. In the chamber 4 the chute 3 is connected to a collecting conduit 6 which in turn is connected to a refuse suction conduit system in which, at least during certain periods of time, a suction-produced conveying air-stream is flowing. At the lower end of the insertion chute, i.e. at its connection to the collecting conduit 6 a valve means 5 may be provided for selectively closing and opening the lower end of the chute 3. In the ground-level plan the chamber 4 is provided with a hatch 7 through which the chamber is accessible for maintenance and repair work. This design of the system causes the above discussed problems and disadvantages regarding excavation for and casting of the chamber 4 and regarding the inconvenient and troublesome maintenance and repair work.

Figure 2:
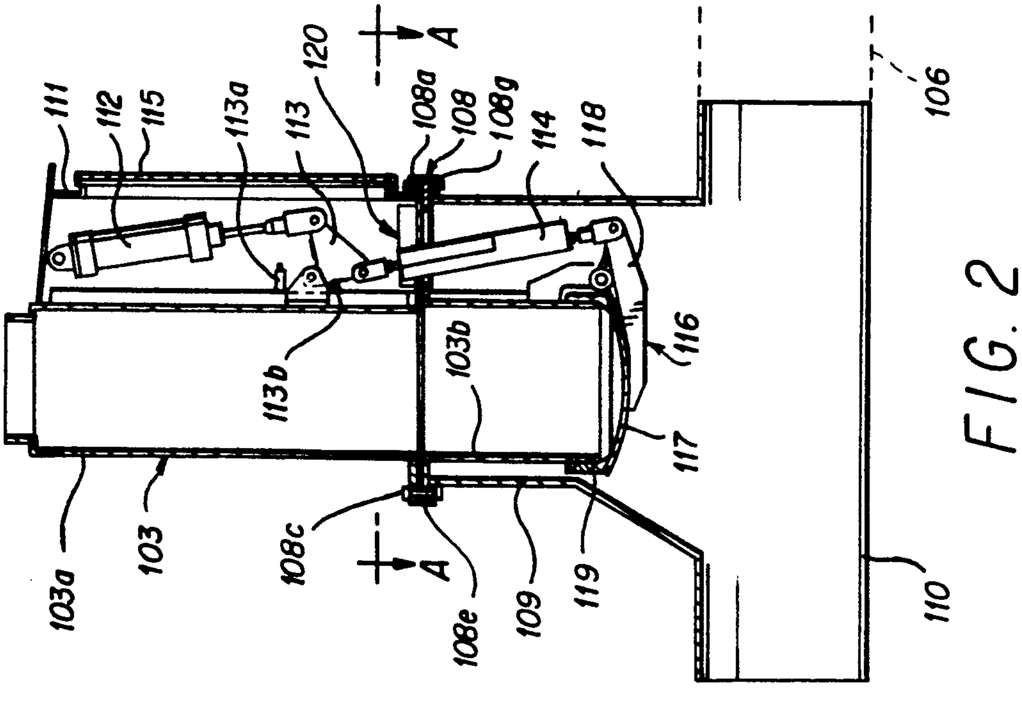
FIG. 2 illustrates, partly in section, the insertion chute according to the present invention, with a valve means in its closed condition.

In FIG. 2 the insertion chute according to the invention is illustrated partially in section, whereby the valve operating means are not illustrated in section. FIG. 2 clearly illustrates that the insertion chute 103 according to the invention comprises an upper chute portion 103*a* and a lower chute portion 103*b* which through a flange joint 108 are connected to the branching 109 of a T-piece 110 connected to the collecting conduit 106.

Figure 4:
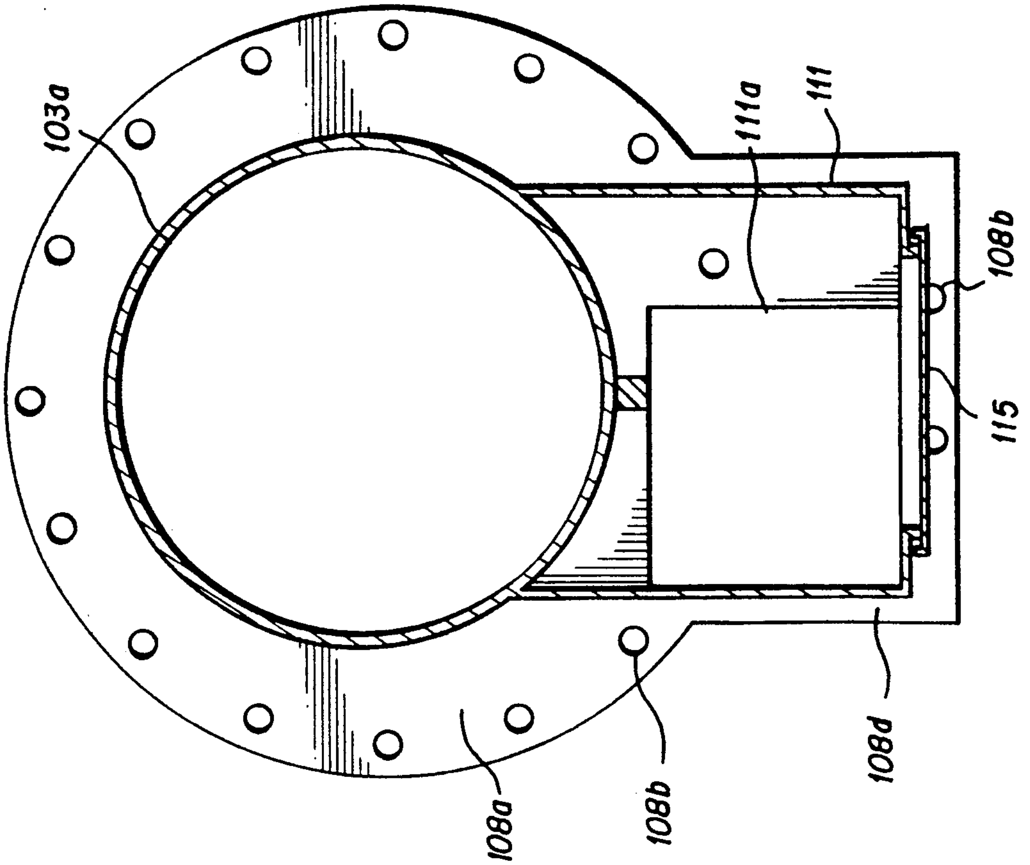
FIG. 4 illustrates, in a section along line A—A in FIG. 2, the upper portion of the chute with the valve operating means removed.

FIGS. 2 and 4 illustrate that the upper portion 103*a* of the insertion chute 103 is substantially cylindrical and is provided at its lower end with a connecting flange 108*a* having bores 108*b* provided therein for receiving mounting bolts 108*c*. The upper end of the upper chute portion 103*a* is intended to communicate with a sluice-like receiving means (not shown), for instance of the kind disclosed and illustrated in the above mentioned Swedish patent specification. A substantially rectangular, box-like superstructure 111 is welded to the exterior of the upper chute portion 103*a*, and this superstructure is intended to receive the valve operating means 112 which, in the illustrated embodiment, consists of a cylinder, preferably a pneumatic cylinder. The rear end wall of the cylinder 112 is pivotally journalled to the upper chute portion 103*a* and its free piston rod end is pivotally connected to a rotary transmission link 113 which is also rotatably journalled in the upper chute portion 103*a*. A valve operating rod 114 is also pivotally connected to the rotary transmission link, as will be described more closely below. The superstructure 111 is provided with a lid 115 at one of its sides, and through this lid it is possible to get access to the valve operating means for maintenance and repair thereof and of the control equipment for the valve means which is also provided in the superstructure 111 but which is not described closely herein since it does not form any part of the invention. A projecting portion 108*d* of the flange 108*a* of the upper chute portion 103*a* forms the bottom of the superstructure 111 and is also provided with a recess 111*a* through which the operating rod 114 is extended and through which wires may also be passed. The recess also serves to ventilate the interior of the superstructure to the environment.

Figure 5:
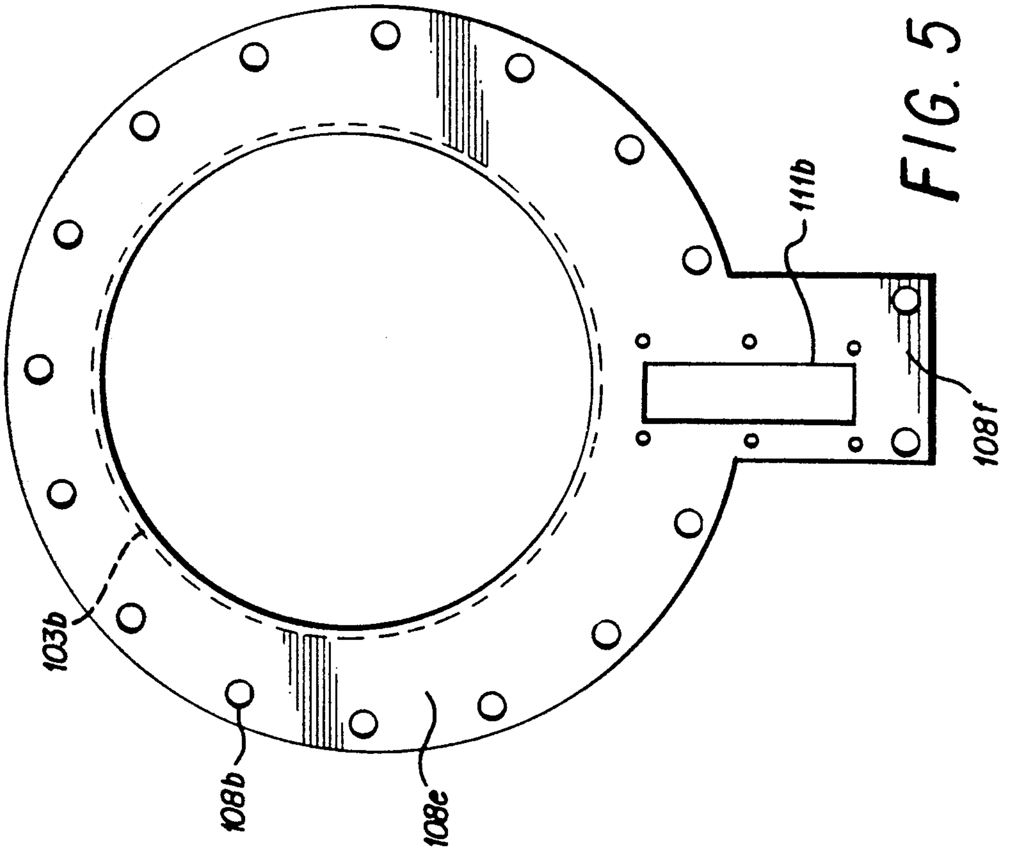
FIG. 5 is a top view of the lower portion of the chute, without valve operating means and seal unit.

FIGS. 2 and 5 illustrate that the lower portion 103*b* of the insertion chute 103 is also substantially cylindrical. However, it has as slightly larger diameter than that of the upper portion 103*a*, and the purpose thereof is to guarantee that manufacturing tolerances do not cause the formation of any steps at the transition between the upper and lower portions, on which steps refuse otherwise might get stuck. The lower portion 103*b* of the chute is also, at its upper end, provided with a connecting flange 108*e* having bores 108*b* which in the assembled condition coincide with those of the connecting flange of the upper chute portion 103*a*, so that the mounting bolts 108*a* may be passed through said bores. At a position corresponding to that of the projecting portion 108*d* of the flange 108*a* of the upper chute portion 103*a* the flange 108*e* of the lower chute portion 103*b* is also provided with a projecting portion 108*f* having an elongated groove 111*b* through which the operating rod 114 may be passed, whereby the length of the groove at least corresponds to the movement of the operating rod 114 when operating the valve means 116 consisting of a flap 117 pivotally journalled at the lower end of the lower chute portion 103*b*. The lower end of the operating rod 114 engages a lever 118 attached to the flap, for manoeuvring the flap 117 between its closed and opened conditions (compare with FIGS. 2 and 3). A rubber sealing ring 119 is provided around the lower end of the lower chute portion 103*b*, and the flap 117 sealingly engages this sealing ring when the flap is in its closed condition (see FIG. 2).

Figure 3:
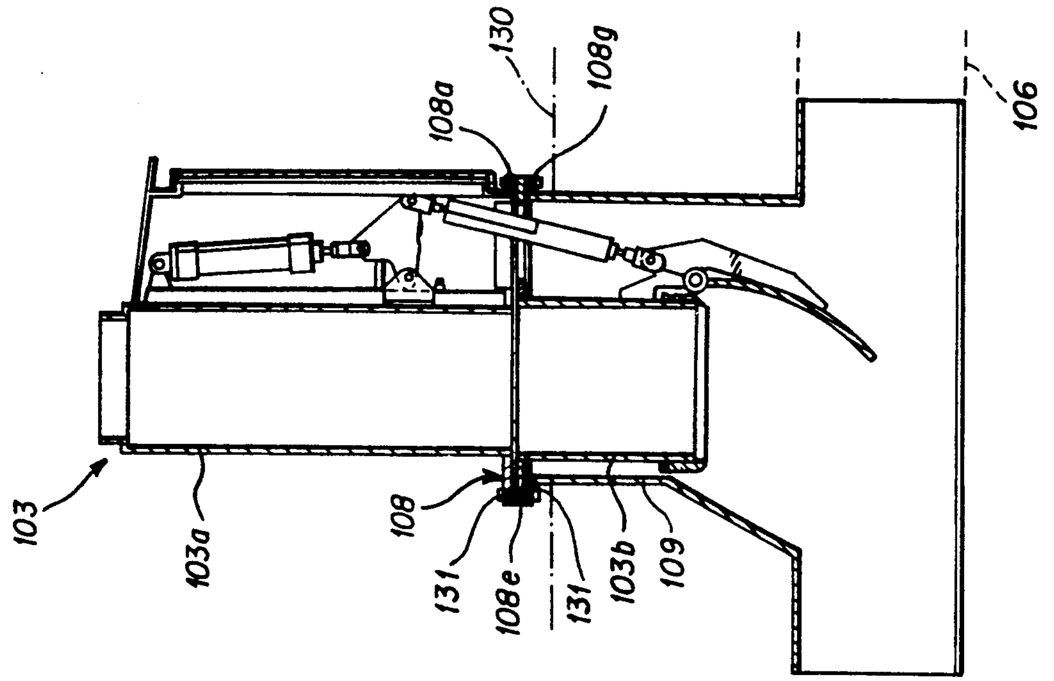
FIG. 3 illustrates the insertion chute according to the present invention, in a view corresponding to that of FIG. 2, but with the valve means in its open condition.
Figure 6:
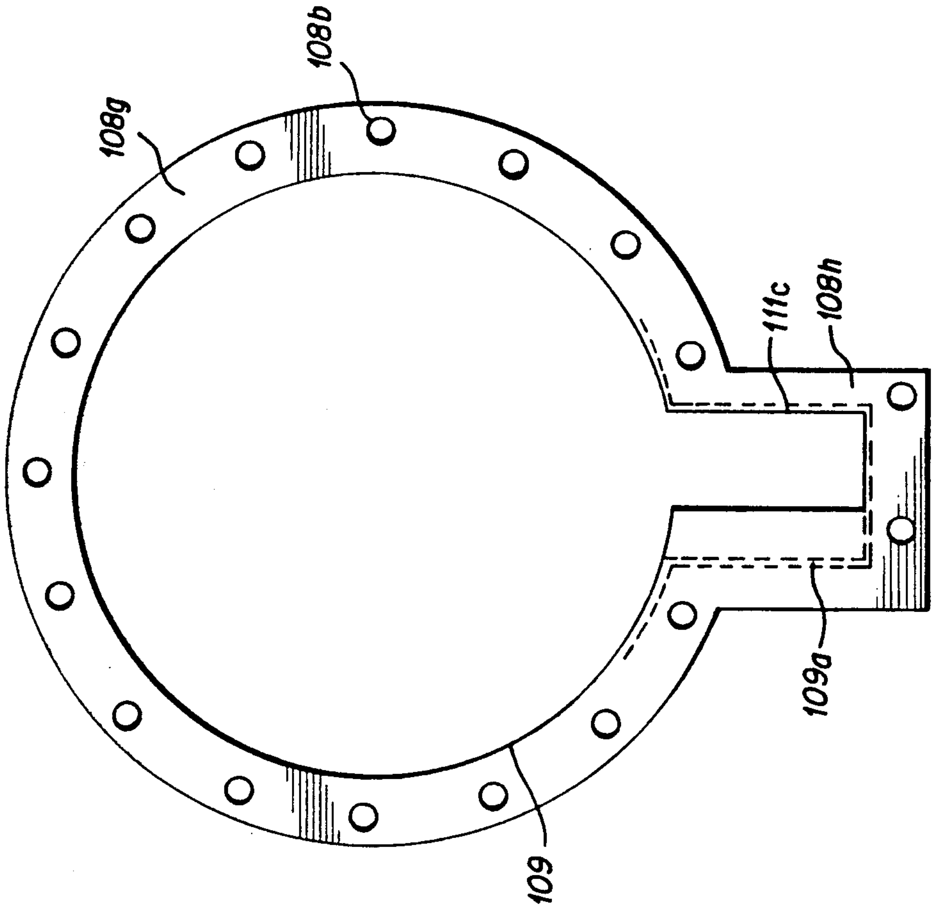
FIG. 6 is a top view of the branching of the T-piece.

FIGS. 2 and 3 illustrate that the lower portion 103*b* of the chute, the valve 116 and the operating rod 114 are received in the branching 109 of the T-piece 110, said branching also having a substantially cylindrical shape, as is clear from FIG. 6, but having a diameter which is so much larger than that of the lower chute portion that the lower chute portion 103*b* may be inserted therein. The branching is also provided with a portion 109*a* being substantially rectangular in cross-section and projecting from the cylindrical portion for receiving the operating rod 114 and the valve means 116. Like the chute portions the branching 109 comprises, at its upper end, a flange 108*g* having bolt bores 108*b* and a projecting portion 108*h*, said projecting portion 108*h* being provided with a groove 111*c* being open into the cylindrical portion of the branching and serving as a passage for the operating rod 114.

Figure 8A:
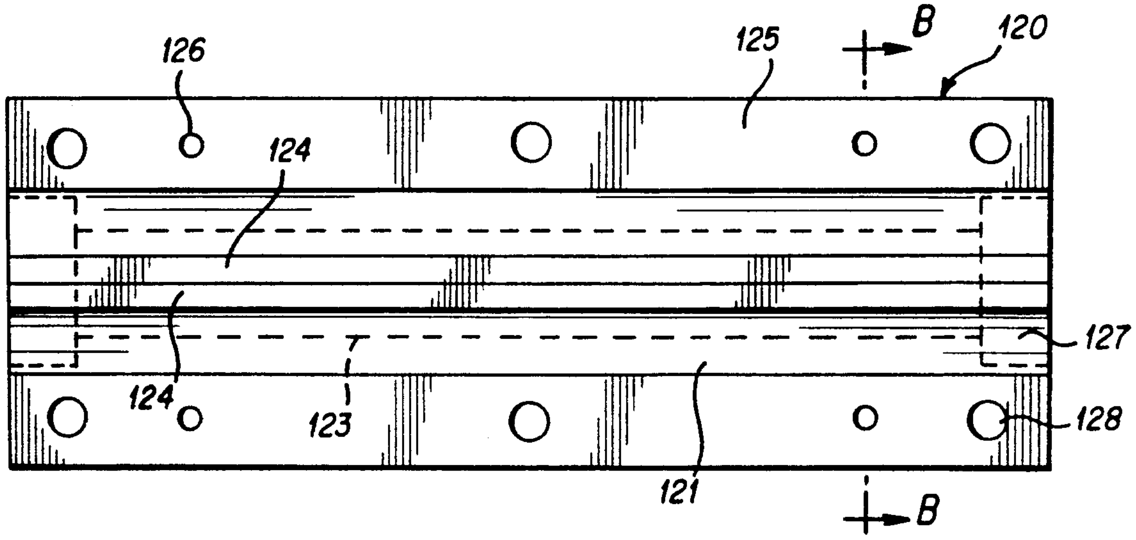
FIG. 8*a* is a top elevation of the seal unit for the operating rod.
Figure 8B:
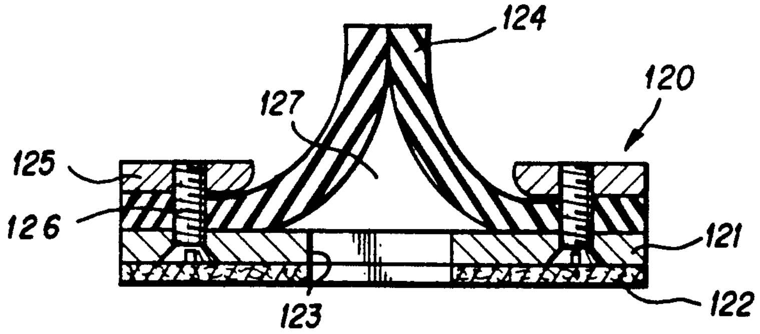
FIG. 8*b* is a section along line B—B in FIG. 8*a* of the seal unit.

A seal unit 120 is attached by means of screws to the upper side of the flange 108*e* and is intended to seal the passage of the operating rod 114 through the groove 111*b* in the flange 108*e* of the lower chute portion 103*b* against the conveying air-stream in the collecting conduit. FIGS. 8*a* and 8*b* illustrate that the seal unit 120 consists of a rectangular plate 121 which at its underside is provided with a gasket 122 which is bonded thereto and which is provided with a longitudinal groove 123 corresponding to and in the assembled condition coinciding with the groove 111*b* of the flange 108*e*. On the upper side of the plate 121, on each side of the groove 123, two rubber mouldings 124 are clamped by means of flat bars 125 and mounting screws 126, said rubber mouldings each having width substantially exceeding half the width of the plate 121 so that the free edges of the rubber mouldings 124 sealingly engage each other to form an inverted V. In order to seal the space between the rubber mouldings 124 at their short edges filling members 127, for instance of epoxy cement, are provided which may suitably be attached by bonding or screwing from below and in a manner not illustrated in detail. The seal unit 120 is attached to the flange 108*e* by means of mounting screws 128 which simultaneously provide additional clamping of the rubber mouldings 124.

Figure 7:
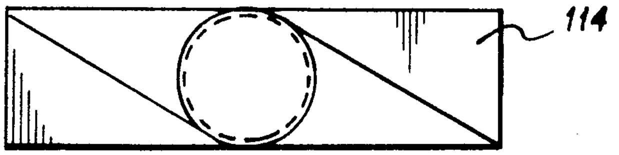
FIG. 7 is an endview of the lower operating rod.

FIG. 7 and to a certain extent also FIGS. 2 and 3 illustrate that the operating rod 114 is manufactured from flat bar steel or any other correspondingly shaped blank of for instance plastic, from which two opposite longitudinal edges have been chamfered by cutting off the opposite sides thereof along the length of the operating rod which will be engaging the rubber mouldings 124 of the seal unit 120 during operation of the valve. In cross-section, each side is cut off from one longitudinal edge and approximately to the longitudinal center line of the opposite long side where the chamfer is rounded towards the long side. Through this processing said portion of the operating rod 114 will be formed as a rhomboid in section. As an example it may also be mentioned that if the dimensions of the flat bar steel is 20×70 mm the above described chamfering or cutting-off of the longitudinal edges results in a rhomboid shape having an acute angle of approximately 30°, whereby an excellent sealing is continuously maintained between the operating rod 114 and the rubber mouldings 124 during the valve operating movement of the operating rod.

The function of the insertion chute is not discussed in detail herein, but in this regard reference is made to for instance the above mentioned Swedish patent No. 7302392-2 and especially regarding the operation of the valve dependent upon different factors. In this connection it should only be mentioned that the valve means 116 is self-locking in its closed position due to the fact that the extended center line of the operating rod 114 towards the end of the closing movement passes the pivot axle of the pivot-transmission link 113 so that the force applied by the seal pressure and refuse collected on the valve member 117, through the lever 118 and the operating rod 114 serves to maintain the pivot-transmission link 113 in the corresponding position, abutting a stop 113*b*. Due to this fact the operating cylinder 112 does not have to be continuously pressurized, and pressure will only have to be applied when the valve is to be operated. A corresponding stop 113*a* is provided for stopping the pivot-transmission link 113 in the fully open position of the valve means 116.

FIGS. 2 and 3 illustrate that the insertion chute is assembled by inserting the lower chute portion 103*b* with the operating rod 114 and the valve means 116 into the branching 109 so that its flange 108*e* abuts the flange 108*f* of the branching 109. Preferably the connection between the flanges is sealed by bonding a gasket 131 to the underside of the flange 108*e* of the lower chute portion 103*b*. Subsequently the upper chute portion 103*a* is placed on the lower chute portion 103*b* with its flange 108*a* abutting the flange 108*e* of the lower chute portion, whereupon the flange joint 108 is completed by inserting and tightening the connecting bolts 108*c* so that the lower chute portion 103*b* is clamped between the upper chute portion 103*a* and the branching 109. Possibly a gasket 131 may also be provided on the underside of the flange 108*a* of the upper chute portion 103*a*, for sealing between the upper and lower chute portions Finally the operating rod 114 is connected to the pivot-transmission link 113 and this work may be easily performed when the lid 115 has been opened.

It will be appreciated that due to the fact that the branching 109 has such a length that the flange joint 108 will be positioned just above the ground surface, as indicated at 130 in FIG. 3, repair and maintenance work is easily performed on all components or parts related to the insertion chute. When work is to be performed on the operating means 112, the pivot-transmission link 113 or the control equipment it is only necessary to open the lid 115. If, on the other hand, work is to be performed on the valve means 116 or its seal 119 the operating rod 114 is first disconnected from the pivot-transmission link 113 and then the bolts 108*c* of the flange joint 108 are unscrewed, whereupon the upper chute portion 103*a* may be lifted off. The lower chute portion 103*b* and the valve means 116 may then be lifted off as a unit whereby repair work may be performed on location or alternatively a replacement unit may be assembled so that the insertion chute may immediately come into use again. Due to the relatively simple removal of the complete insertion chute 103 it is also easy to take measures in case of clogging and obstruction.

Figure 9:
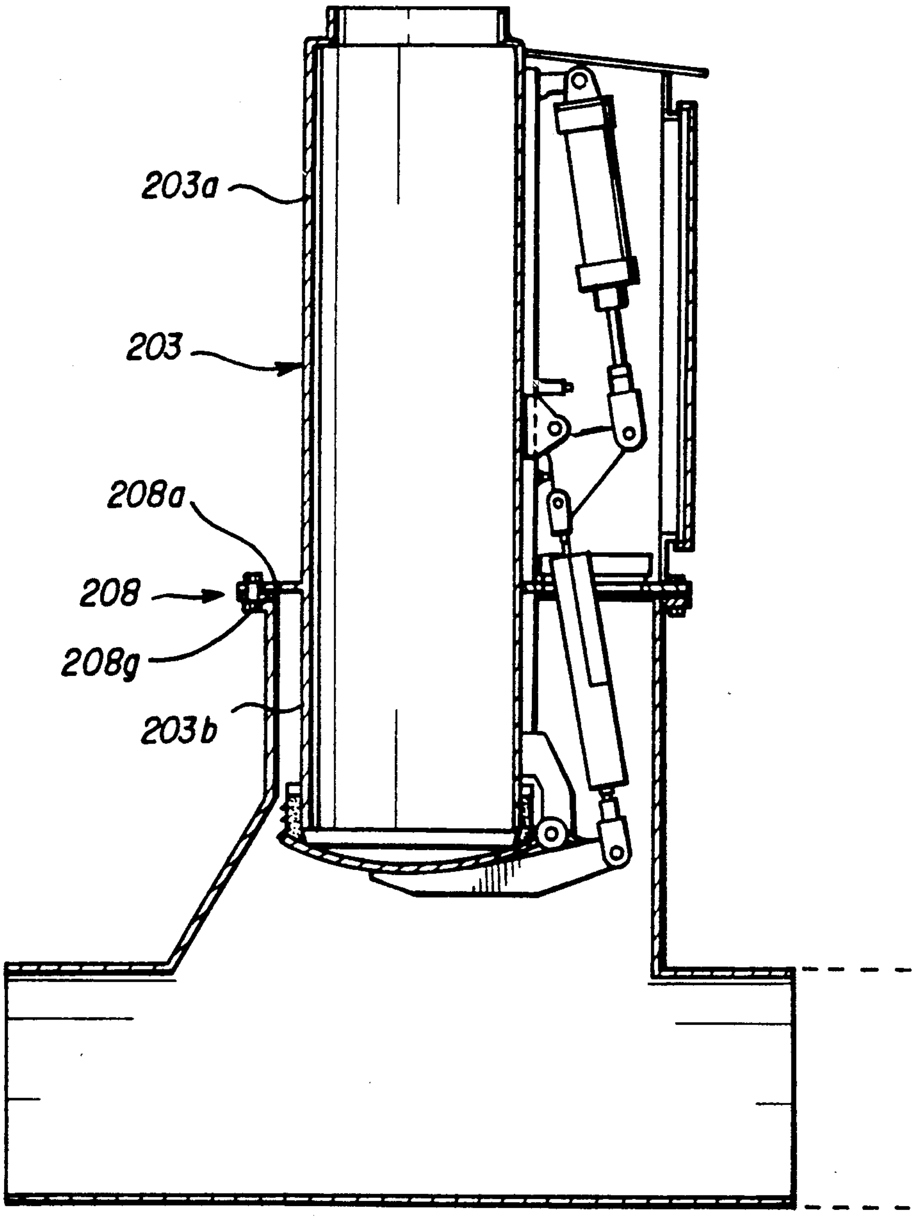
FIG. 9 illustrates an alternative embodiment of the insertion chute, in a view corresponding to that of FIG. 2.

FIG. 9 illustrates an alternative embodiment of the insertion chute according to the invention, said insertion chute 203 being built as a unit, i.e. the upper portion 203*a* and the lower portion 203*b* of the insertion chute are integral. In this case only one connecting flange 208*a* is provided on the exterior of the insertion chute 203 at the transition between the upper and lower portions 203*a* and 203*b* respectively of the insertion chute. In this embodiment the flange joint 208 is formed by this single connecting flange 208*a* on the insertion chute 203 and by the connecting flange 208*g* of the branching The connecting flange 208*g* of the branching is preferably identical to that of the first embodiment, while the connecting flange 208*a* may be either identical to the connecting flange 108*e* of the first embodiment or may alternatively be slightly modified to resemble the connecting flange 108*a* of the first embodiment, in order to form also a portion of the bottom of the superstructure. It is vital that the connecting flange 208*a* corresponds to the connecting flange 108*e* of the first embodiment as regards the sealing against the branching and as regards the sealed through-passage of the operating rod. The remaining details of this second embodiment are identical to those of the first embodiment.

The advantage of the embodiment of the insertion chute illustrated in FIG. 9 is that the manufacturing thereof is substantially simplified which also means that the manufacturing costs may be kept low. On the other hand the insertion chute of this design will be more difficult to handle, and for that reason the first embodiment, according to which the insertion chute may be divided, is preferred in the cases where it is desirable to perform work without using any lifting equipment. According to this first embodiment where the insertion chute may be divided, the portions of the insertion chute may be lifted off by two persons without the aid of any hoisting crane or the like.

Although preferred embodiments of the present invention have been illustrated and disclosed herein it should be obvious that further modifications may be carried out by men skilled in the art without departing from the scope of the invention. As an example the insertion chute may also be performed without any valve means in applications where the service conditions are such that the valve means are not necessary, but the refuse may fall directly down into the collecting conduit. In this embodiment the portions may be quite cylindrical in shape. Thus, the scope of the invention shall only be determined by the enclosed patent claims.

What is claimed is:

1. Isolated insertion chutes (103; 203) of the kind which at spaced intervals are connected to an underground suction conveying conduit communicating with a refuse suction system, the upper end of each chute above ground comprising a closable insertion opening and the lower end of each chute below ground being connected to the suction conveying conduit and being closable by means of a valve means (116) provided at said lower end and having valve operating means (112), characterized in that the insertion chute (103; 203) consists of an upper chute portion (103*a*; 203*a*) and a lower chute portion (103*b*; 203*b*), in that the insertion chute comprises at least one connecting flange (108*a*, 108*e*; 208*a*) in the transition area between the upper chute portion (103*a*; 203*a*) and the lower chute portion (103*b*; 203*b*), in that the lower chute portion (103*b*; 203*b*) is received in a branching (109) extended from the suction conveying conduit (106) and at its upper end also having a connecting flange (108*g*; 208*g*), said at least one connecting flange (108*a*, 108*e*; 208*a*) of the insertion chute (103; 203) being releasably connected to the connecting flange (108*g*; 208*g*) of the branching (109), in that the branching (109) has such a length in relation to the depth cf the suction conveying conduit (106) below the ground surface, that the flange joint (108; 208) formed by the connecting flanges (108*a*, 108*e*, 108*g*; 208*a*, 208*g*) is positioned above the ground surface (130), and in that the valve operating means (112) is mounted to the insertion chute (103; 203), whereby the insertion chute with valve means (116) and valve operating means (112) is dismountable from the suction conveying conduit (106) from the ground level, for maintenance and repair work.

2. Insertion chute according to claim 1, characterized in that the insertion chute (103) consists of a separate upper chute portion (103*a*) which at its lower end is provided with a connecting flange (108*a*), and a separate lower chute portion (103*b*) which at its upper end is provided with a connecting flange (108*e*), and in that the connecting flange (108*e*) of the lower chute portion (103*b*) is releasably clamped between the connecting flange (108*a*) of the upper chute portion (103*a*) and the connecting flange (108*g*) of the branching (109).

3. Insertion chute according to claim 1, characterized in that the insertion chute (203) is designed as a unit with the upper chute portion (203*a*) and the lower chute portion (203*b*) integral with each other and in that a connecting flange (208*a*) is provided externally on the insertion chute (203) at the transition between the upper and lower chute portions.

4. Insertion chute according to claim 1 characterized in that the branching (109) is part of a T-piece (110) connected to the section conveying conduit (106).

5. Insertion chute according to claim 1 characterized in that the upper chute portion (103*a*; 203*a*) comprises a box-like superstructure (111) which is welded to the upper chute portion and in which the valve operating means (112) is journalled, in that the valve operating means (112) is connected to a transmission link (113) mounted to the upper chute portion (103*a*; 203*a*), in that one end of an operating rod (114) is likewise connected to the transmission link (113) said operating rod (114) being extended through a through-passage (111*b*) in the connecting flange (108*e*) of the lower chute portion (103*b*; 203*b*) or alternatively in the connecting flange (208*a*) of the insertion chute (203) and through a through-passage (111*c*) in the connecting flange (108*g*; 208*g*) of the branching (109) and the opposite end of the operating rod being connected to the valve means (116) mounted at the lower end of the lower chute portion (103*b*; 203*b*).

6. Insertion chute according to claim 5, characterized in that a seal unit (120) for the sealed through-passage of the operating rod (114) is mounted at the connecting flange (108*e*) of the lower chute portion (103*b*) or alternatively at the connecting flange (208*a*) of the insertion chute (203).

7. Insertion chute according to claim 6, characterized in that the seal unit (120) consists of a plate (121) attached to the connecting flange (108*e*) of the lower chute portion (103*b*) or alternatively to the connecting flange (208) of the insertion chute, said plate having an elongated groove (123) therein through which the operating rod (114) is extended, and in that a rubber moulding (124) is clamped on each side of the groove (123) and in that each of the rubber mouldings (124) have a width essentially exceeding half the width of the plate (121), whereby the free ends of the rubber mouldings (124) sealingly engage each other along the length of the groove (123), and in that filling members (127) are provided for sealing the space between the short edges of the rubber mouldings (124).

8. Insertion chute according to claim 7, characterized in that the operating rod (114) is manufactured from a flat bar steel which has been cut off or chamfered at two opposite edges and along a portion of its length, for forming a rhomboid shape in section.

9. Insertion chute according to claim 1, characterized in that a gasket (131) is bonded to the underside of the connecting flange (108*e*) of the lower chute portion (103*b*) or alternatively to the connecting flange (208*a*) of the insertion chute (203), for sealing between said flange and the flange (108*g*) of the branching (109).

10. Insertion chute according to claim 1, characterized in that the upper chute portion (103*a*) and the lower chute portion (103*b*) has a cylindrical shape and in that the lower chute portion (103*b*) has a slightly larger diameter than the upper chute portion (103*a*).

11. Insertion chute according to claim 3, characterized in that the branching (109) is part of a T-piece (110) connected to the suction conveying conduit (106).

12. Insertion chute according to claim 2, characterized in that the upper chute portion (103*a*; 203*a*), comprises a box-like superstructure (111) which is welded to the upper chute portion and in which a valve operating means (112) is journalled, in that the valve operating means (112) is connected to a transmission link (113) mounted to the upper chute portion (103*a*; 203*a*), in that one end of an operating rod (114) is likewise connected to the transmission link (113), said operating rod (114) being extended through a through-passage (111*b*) in the connecting flange (108*e*) of the lower chute portion (103*b*; 203*b*) or alternatively in the connecting flange (208*a*) of the insertion chute (203) and through a through-passage (111*c*) in the connecting flange (108*g*; 208*g*) of the branching (109) and the opposite end of the operating rod being connected to the valve means (116) mounted at the lower end of the lower chute portion (103*b*; 203*b*).

13. Insertion chute according to claim 3, characterized in that the upper chute portion (103*a*; 203*a*) comprise a box-like superstructure (111) which is welded to the upper chute portion and in which a valve operating means (112) is journalled, in that the valve operating means (112) is connected to a transmission link (113) mounted to the upper chute portion (103*a*; 203*a*), in that one end of an operating rod (114) is likewise connected to the transmission link (113), said operating rod (114) being extended through a through-passage (111*b*) in the connecting flange 108*e*) of the lower chute portion (103*b*; 203*b*) or alternatively in the connecting flange (208*a*) of the insertion chute (203) and through a through-passage (111*c*) in the connecting flange (108*g*; 208*g*;) of the branching (109) and the opposite end of the operating rod being connected to the valve means (116) mounted at the lower end of the lower chute portion (103*b*; 203*b*).

14. Insertion chute according to claim 4 characterized in that the upper chute portion (103*a*; 203*a*) comprises a box-like superstructure (111) which is welded to the upper chute portion and in which a valve operating means (112) is journalled, in that the valve operating means (112) is connected to a transmission link (113) mounted to the upper chute portion (103*a*; 203*a*), in that one end of an operating rod (114) is likewise connected to the transmission link (113), said operating pod (114) being extended through a through-passage (111*b*) in the connecting flange 108*e*) of the lower chute portion (103*b*; 203*b*) or alternatively in the connecting flange (208*a*) of the insertion chute (203) and through a through-passage (111*c*) in the connecting flange (108*g*; 108*g*) of the branching (109) and the opposite end of the operating rod being connected to the valve means (116) mounted at the lower end of the lower chute portion (103*b*; 203*b*).

15. Insertion chute according to claim 11 characterized in that the upper chute portion (103*a*; 203*a*) comprises a box-like superstructure (111) which is welded to the upper chute portion and in which a valve operating means (112) is journalled, in that the valve operating means (112) is connected to a transmission link (113) mounted to the upper chute portion (103*a*; 203*a*), in that one end of an operating rod (114) is likewise connected to the transmission link (113), said operating rod (114) being extended through a through-passage (111*b*) in the connecting flange 108*e*) of the lower chute portion (103*b*; 203*b*) or alternatively in the connecting flange (208*a*) of the insertion chute (203) and through a through-passage (111*c*) in the connecting flange (108*g*; 208*g*) of the branching (109) and the opposite end of the operating rod being connected to the valve means (116)

mounted at the lower end of the lower chute portion (103*b*; 203*b*).

16. Insertion chute according to claim 15, characterized in that a seal unit (120) for the sealed through-passage of the operating rod (114) is mounted at the connecting flange (108*e*) of the lower chute portion (103*b*) or alternatively at the connecting flange (208*a*) of the insertion chute (203).

17. Insertion chute according to claim 16, characterized in that the seal unit (120) consists of a plate (121) attached to the connecting flange (108*e*) of the lower chute portion (103*b*) or alternatively to the connecting flange (208) of the insertion chute, said plate having an elongated groove (123) therein through which the operating rod (114) is extended, and in that a rubber moulding (124) is clamped on each side of the groove (123) and in that each of the rubber mouldings (124) have a width essentially exceeding half the width of the plate (121), whereby the free ends of the rubber mouldings (124) sealingly engage each other along the length of the groove (123), and in that filling members (127) are provided for sealing the space between the short edges of the rubber mouldings (124).

18. Insertion chute according to claim 17, characterized in that the operating rod (114) is manufactured from a flat bar steel which has been cut off or chamfered at two opposite edges and along a portion of its length, for forming a rhomboid shape in section.

19. Insertion chute according to claim 18, characterized in that a gasket (131) is bonded to the underside of the connecting flange (108*e*) of the lower chute portion (103*b*) or alternatively to the connecting flange (208*a*) of the insertion chute (203), for sealing between said flange and the flange (108*g*) of the branching (109).

20. Insertion chute according to claim 19, characterized in that the upper chute portion (103*a*) and the lower chute portion (103*b*) has a cylindrical shape and in that the lower chute portion (103*b*) has a slightly larger diameter than the upper chute portion (103*a*).

21. Insertion chute according to claim 7, characterized in that the operating rod (114) is manufactured from plastic material, which has been cut off or chamfered at two opposite edges and along a portion of its length, for forming a rhomboid shape in section.

22. Insertion chute according to claim 17, characterized in that the operating rod (114) is manufactured from plastic material, which has been cut off or chamfered at two opposite edges and along a portion of its length, for forming a rhomboid shape in section.

* * * * *